United States Patent
Cho et al.

(10) Patent No.: US 12,298,970 B2
(45) Date of Patent: May 13, 2025

(54) METHOD AND SYSTEM FOR ANALYZING NATURAL LANGUAGE DATA BY USING DOMAIN-SPECIFIC LANGUAGE MODELS

(71) Applicant: JPMorgan Chase Bank, N.A., New York, NY (US)

(72) Inventors: Naan Cho, New York, NY (US); Zhen Zeng, Ypsilanti, MI (US); William Watson, Long Beach, NY (US); Manuela Veloso, New York, NY (US); Matthew Brian MacKay, Los Angeles, CA (US); Tucker Richard Balch, Suwanee, GA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 19 days.

(21) Appl. No.: 18/217,868

(22) Filed: Jul. 3, 2023

(65) Prior Publication Data
US 2025/0013633 A1    Jan. 9, 2025

(51) Int. Cl.
*G06F 16/242* (2019.01)
*G06F 16/2457* (2019.01)
*G06F 16/25* (2019.01)

(52) U.S. Cl.
CPC ...... *G06F 16/243* (2019.01); *G06F 16/24575* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 2015/0339376 A1* | 11/2015 | Wieweg | G06F 16/3329 717/145 |
| 2019/0155425 A1* | 5/2019 | Pionkowski | G06F 16/24575 |
| 2020/0004876 A1* | 1/2020 | Sinha | G06F 16/338 |
| 2021/0240776 A1* | 8/2021 | Jawagal | G06N 3/049 |
| 2022/0156489 A1* | 5/2022 | Agarwal | G06F 40/106 |
| 2023/0343331 A1* | 10/2023 | Manuvinakurike | G10L 15/063 |
| 2024/0223628 A1* | 7/2024 | Kumar | H04L 65/4015 |
| 2024/0303496 A1* | 9/2024 | Nair | G06F 40/279 |

* cited by examiner

*Primary Examiner* — Christopher J Raab
(74) *Attorney, Agent, or Firm* — Greenblum & Bernstein, P.L.C.

(57) ABSTRACT

A method for providing a domain-specific language model to facilitate natural language data analytics is disclosed. The method includes aggregating documents from various sources, each of the documents including natural language data; ingesting each of the documents to generate structured data sets that are organized according to a contextual hierarchy; determining prompts that provide domain-specific information for a language model, the domain-specific information including instructions to access the structured data sets; receiving a request via a graphical user interface, the request relating to questions in a natural language format; generating, by using the language model, software codes for the request based on the prompts; and executing each of the software codes to identify results for the request from the structured data sets.

16 Claims, 6 Drawing Sheets

METHOD AND SYSTEM FOR ANALYZING NATURAL LANGUAGE DATA BY USING DOMAIN-SPECIFIC LANGUAGE MODELS

BACKGROUND

1. Field of the Disclosure

This technology generally relates to methods and systems for analyzing natural language data, and more particularly to methods and systems for providing domain-specific large language models to facilitate automated analytics of unstructured streams of natural language data.

2. Background Information

Many business entities maintain large collections of documents such as, for example, custodial contracts that are necessary for various business operations. Often, these large collections include natural language data that must be carefully analyzed to identify pertinent information. Historically, implementations of conventional management techniques for managing the natural language data have resulted in varying degrees of success with respect to precision, efficiency, and scalability.

One drawback of using the conventional management techniques is that in many instances, the natural language data in each of the documents are highly unstructured, linguistically inconsistent, and legally complex streams of text. As a result, automatically analyzing and automatically extracting pertinent information from these large collections of documents are difficult tasks for conventional language models such as, for example, large language models. Additionally, due to the difficulties in analyzing and extracting the pertinent information, extending the usability of the large collections of documents such as, for example, via a robust question and answer system may be limited.

Therefore, there is a need to provide a robust natural language data management solution that modularizes different components such as, for example, data ingestion and domain-specific large language models to facilitate automated analytics of unstructured streams of natural language data.

SUMMARY

The present disclosure, through one or more of its various aspects, embodiments, and/or specific features or sub-components, provides, inter alia, various systems, servers, devices, methods, media, programs, and platforms for providing domain-specific large language models to facilitate automated analytics of unstructured streams of natural language data.

According to an aspect of the present disclosure, a method for providing a domain-specific language model to facilitate natural language data analytics is disclosed. The method is implemented by at least one processor. The method may include aggregating a plurality of documents from at least one source, each of the plurality of documents may include natural language data; ingesting each of the plurality of documents to generate at least one structured data set that is organized according to a contextual hierarchy; determining at least one prompt that provides domain-specific information for a language model, the domain-specific information may include instructions to access the at least one structured data set; receiving a request via a graphical user interface, the request may relate to at least one question in a natural language format; generating, by using the language model, at least one software code for the request based on the at least one prompt; and executing each of the at least one software code to identify at least one result for the request from the at least one structured data set.

In accordance with an exemplary embodiment, each of the at least one prompt may include at least one from among scenario data that defines a domain-specific scenario, interface data that defines at least one usable application programming interface, and instruction data that orders the language model to generate the at least one software code by using the interface data.

In accordance with an exemplary embodiment, the at least one result may include a modularization of a previously generated software code into at least one function that answers a variant of the at least one question.

In accordance with an exemplary embodiment, to ingest each of the plurality of documents, the method may further include attaching at least one tag to each of the plurality of documents based on content of the corresponding natural language data, each of the at least one tag may include corresponding metadata; formatting at least one data table in each of the plurality of documents to discover at least one corresponding table boundary; and segmenting each of the plurality of documents into at least one section by using at least one stylistic indicator and at least one contextual indicator.

In accordance with an exemplary embodiment, the corresponding metadata may include supplemental information that is automatically identified and automatically retrieved for each of the plurality of documents, the supplemental information may include at least one from among filing information, participant information, agreement information, and date information.

In accordance with an exemplary embodiment, each of the at least one section may include at least one direct citation to original data in the corresponding plurality of documents; and each of the at least one section may further include at least one section label that is assigned according to a tree hierarchy to preserve full sectional context.

In accordance with an exemplary embodiment, to format the at least one data table, the method may further include associating each of the at least one data table with a corresponding placeholder reference, the placeholder reference may represent a spatial relationship between the at least one data table and the plurality of documents; and persisting the placeholder reference within the corresponding plurality of documents in place of the corresponding at least one data table.

In accordance with an exemplary embodiment, the method may further include discovering the at least one table boundary by using spatial positioning of table contents, table styles, visual table indicators, and textual table indicators; and organizing at least one row and at least one column into a machine-readable format.

In accordance with an exemplary embodiment, the language model may include at least one from among a large language model, a deep learning model, a neural network model, a natural language processing model, a machine learning model, a mathematical model, a process model, and a data model.

According to an aspect of the present disclosure, a computing device configured to implement an execution of a method for providing a domain-specific language model to facilitate natural language data analytics is disclosed. The computing device including a processor; a memory; and a communication interface coupled to each of the processor and the memory, wherein the processor may be configured to aggregate a plurality of documents from at least one source, each of the plurality of documents may include natural language data; ingest each of the plurality of documents to generate at least one structured data set that is organized according to a contextual hierarchy; determine at least one prompt that provides domain-specific information for a language model, the domain-specific information may include instructions to access the at least one structured data set; receive a request via a graphical user interface, the request may relate to at least one question in a natural language format; generate, by using the language model, at least one software code for the request based on the at least one prompt; and execute each of the at least one software code to identify at least one result for the request from the at least one structured data set.

In accordance with an exemplary embodiment, each of the at least one prompt may include at least one from among scenario data that defines a domain-specific scenario, interface data that defines at least one usable application programming interface, and instruction data that orders the language model to generate the at least one software code by using the interface data.

In accordance with an exemplary embodiment, the at least one result may include a modularization of a previously generated software code into at least one function that answers a variant of the at least one question.

In accordance with an exemplary embodiment, to ingest each of the plurality of documents, the processor may be further configured to attach at least one tag to each of the plurality of documents based on content of the corresponding natural language data, each of the at least one tag may include corresponding metadata; format at least one data table in each of the plurality of documents to discover at least one corresponding table boundary; and segment each of the plurality of documents into at least one section by using at least one stylistic indicator and at least one contextual indicator.

In accordance with an exemplary embodiment, the corresponding metadata may include supplemental information that is automatically identified and automatically retrieved for each of the plurality of documents, the supplemental information may include at least one from among filing information, participant information, agreement information, and date information.

In accordance with an exemplary embodiment, each of the at least one section may include at least one direct citation to original data in the corresponding plurality of documents; and each of the at least one section may further include at least one section label that is assigned according to a tree hierarchy to preserve full sectional context.

In accordance with an exemplary embodiment, to format the at least one data table, the processor may be further configured to associate each of the at least one data table with a corresponding placeholder reference, the placeholder reference may represent a spatial relationship between the at least one data table and the plurality of documents; and persist the placeholder reference within the corresponding plurality of documents in place of the corresponding at least one data table.

In accordance with an exemplary embodiment, the processor may be further configured to discover the at least one table boundary by using spatial positioning of table contents, table styles, visual table indicators, and textual table indicators; and organize at least one row and at least one column into a machine-readable format.

In accordance with an exemplary embodiment, the language model may include at least one from among a large language model, a deep learning model, a neural network model, a natural language processing model, a machine learning model, a mathematical model, a process model, and a data model.

According to an aspect of the present disclosure, a non-transitory computer readable storage medium storing instructions for providing a domain-specific language model to facilitate natural language data analytics is disclosed. The storage medium including executable code which, when executed by a processor, may cause the processor to aggregate a plurality of documents from at least one source, each of the plurality of documents may include natural language data; ingest each of the plurality of documents to generate at least one structured data set that is organized according to a contextual hierarchy; determine at least one prompt that provides domain-specific information for a language model, the domain-specific information may include instructions to access the at least one structured data set; receive a request via a graphical user interface, the request may relate to at least one question in a natural language format; generate, by using the language model, at least one software code for the request based on the at least one prompt; and execute each of the at least one software code to identify at least one result for the request from the at least one structured data set.

In accordance with an exemplary embodiment, each of the at least one prompt may include at least one from among scenario data that defines a domain-specific scenario, interface data that defines at least one usable application programming interface, and instruction data that orders the language model to generate the at least one software code by using the interface data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
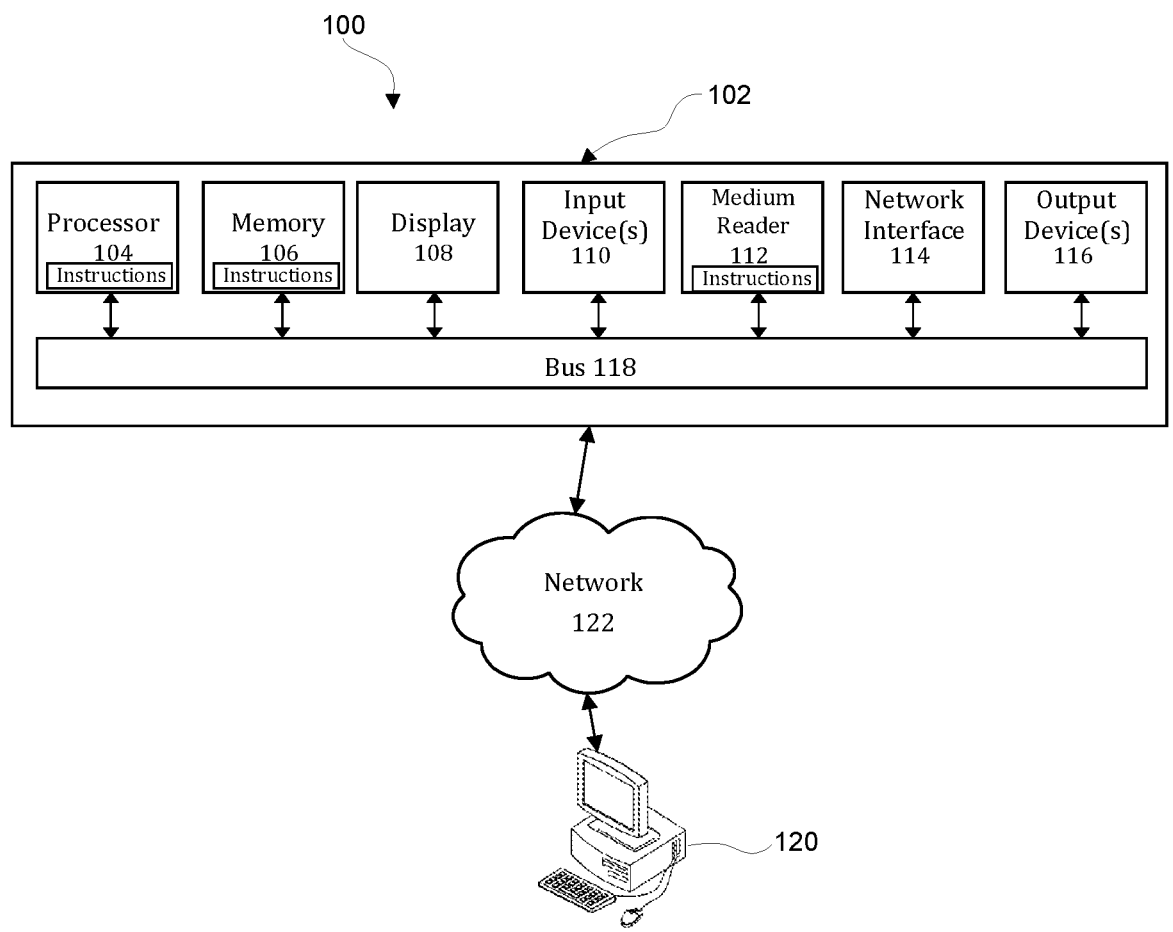
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing domain-specific large language models to facilitate automated analytics of unstructured streams of natural language data.

Figure 2:
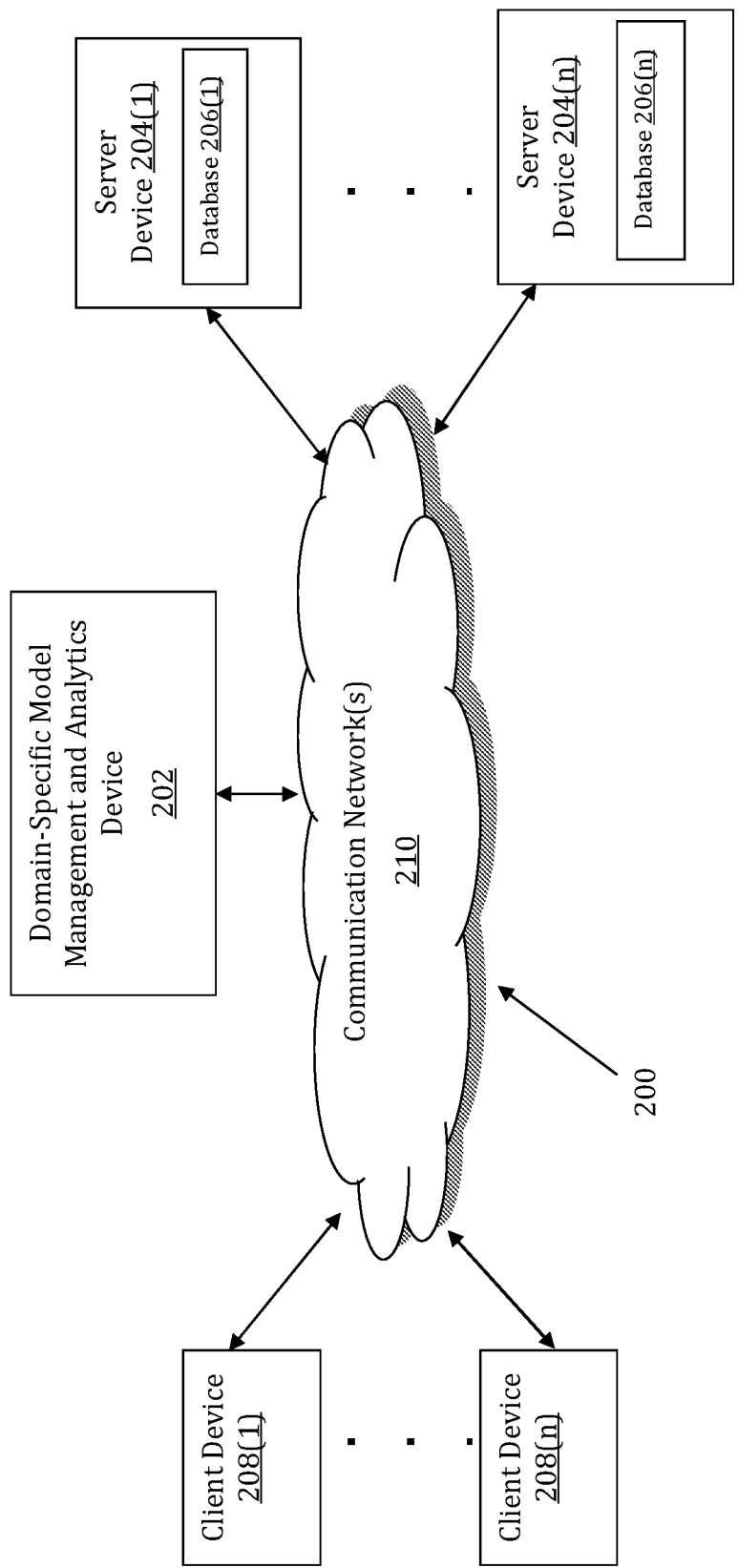
FIG. 2 illustrates an exemplary diagram of a network environment.

Referring to FIG. 2, a schematic of an exemplary network environment 200 for implementing a method for providing domain-specific large language models to facilitate automated analytics of unstructured streams of natural language data is illustrated. In an exemplary embodiment, the method is executable on any networked computer platform, such as, for example, a personal computer (PC).

The method for providing domain-specific large language models to facilitate automated analytics of unstructured streams of natural language data may be implemented by a Domain-Specific Model Management and Analytics (DSMMA) device 202. The DSMMA device 202 may be the same or similar to the computer system 102 as described with respect to FIG. 1. The DSMMA device 202 may store one or more applications that can include executable instructions that, when executed by the DSMMA device 202, cause the DSMMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSMMA device 202 itself, may be located in virtual server(s) running in a cloud-based computing environment rather than being tied to one or more specific physical network computing devices. Also, the application(s) may be running in one or more virtual machines (VMs) executing on the DSMMA device 202. Additionally, in one or more embodiments of this technology, virtual machine(s) running on the DSMMA device 202 may be managed or supervised by a hypervisor.

In the network environment 200 of FIG. 2, the DSMMA device 202 is coupled to a plurality of server devices 204(1)-204(n) that hosts a plurality of databases 206(1)-206(n), and also to a plurality of client devices 208(1)-208(n) via communication network(s) 210. A communication interface of the DSMMA device 202, such as the network interface 114 of the computer system 102 of FIG. 1, operatively couples and communicates between the DSMMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the DSMMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DSMMA devices that efficiently implement a method for providing domain-specific large language models to facilitate automated analytics of unstructured streams of natural language data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSMMA device 202 may be a standalone device or integrated with one or more other devices or apparatuses, such as one or more of the server devices 204(1)-204(n), for example. In one particular example, the DSMMA device 202 may include or be hosted by one of the server devices 204(1)-204(n), and other arrangements are also possible. Moreover, one or more of the devices of the DSMMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DSMMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to domain specific language models, documents, natural language data, structured data sets, contextual hierarchies, prompts, domain-specific information, requests, questions, software codes, results, scenario data, interface data, and instruction data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DSMMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DSMMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DSMMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSMMA device 202, the server devices 204(1)-204(n), or the client devices 208(1)-208(n), for example, may be configured to operate as virtual instances on the same physical machine. In other words, one or more of the DSMMA device 202, the server devices 204(1)-204(n), or the client devices 208(1)-208(n) may operate on the same physical device rather than as separate devices communicating through communication network(s) 210. Additionally, there may be more or fewer DSMMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
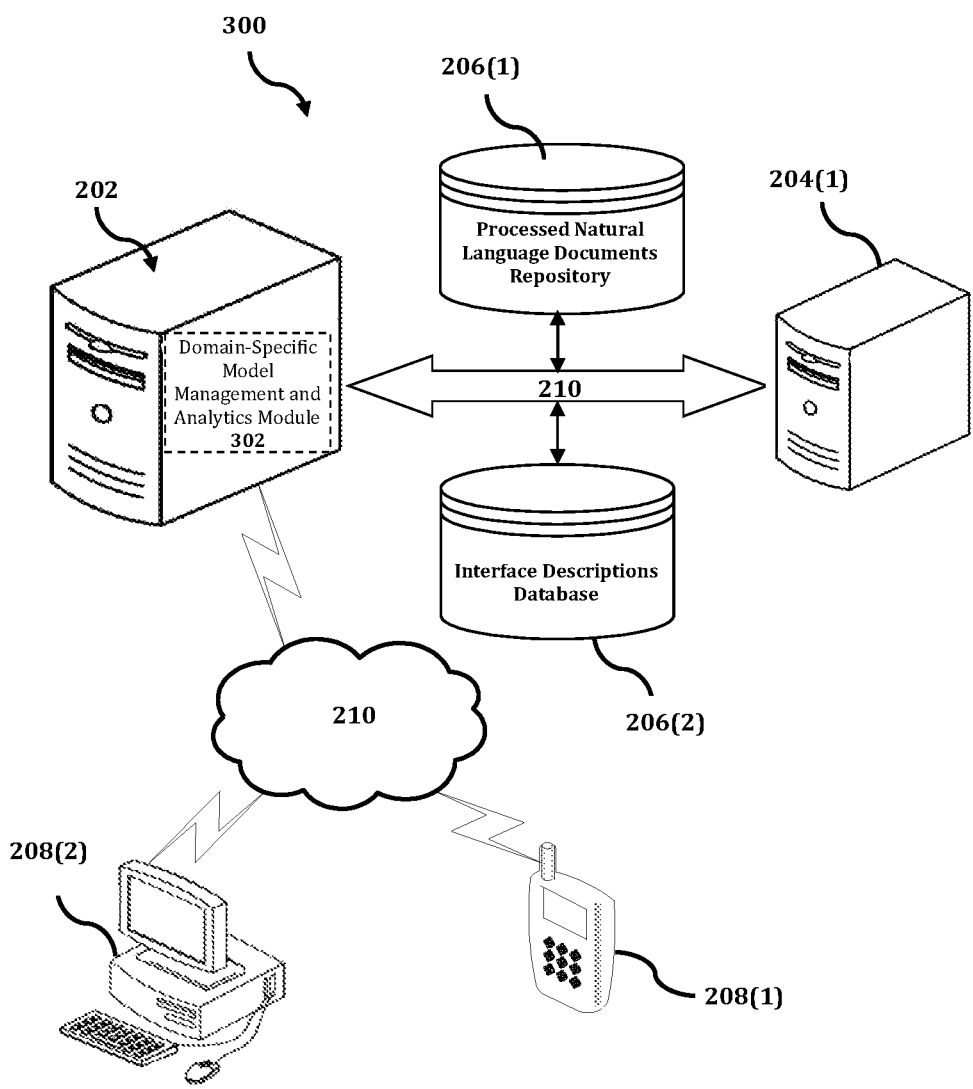
FIG. 3 shows an exemplary system for implementing a method for providing domain-specific large language models to facilitate automated analytics of unstructured streams of natural language data.

The DSMMA device 202 is described and shown in FIG. 3 as including a domain-specific model management and analytics module 302, although it may include other rules, policies, modules, databases, or applications, for example. As will be described below, the domain-specific model management and analytics module 302 is configured to implement a method for providing domain-specific large language models to facilitate automated analytics of unstructured streams of natural language data.

An exemplary process 300 for implementing a mechanism for providing domain-specific large language models to facilitate automated analytics of unstructured streams of natural language data by utilizing the network environment of FIG. 2 is shown as being executed in FIG. 3. Specifically, a first client device 208(1) and a second client device 208(2) are illustrated as being in communication with DSMMA device 202. In this regard, the first client device 208(1) and the second client device 208(2) may be "clients" of the DSMMA device 202 and are described herein as such. Nevertheless, it is to be known and understood that the first client device 208(1) and/or the second client device 208(2) need not necessarily be "clients" of the DSMMA device 202, or any entity described in association therewith herein. Any additional or alternative relationship may exist between either or both of the first client device 208(1) and the second client device 208(2) and the DSMMA device 202, or no relationship may exist.

Further, DSMMA device 202 is illustrated as being able to access a processed natural language documents repository 206(1) and an interface descriptions database 206(2). The domain-specific model management and analytics module 302 may be configured to access these databases for implementing a method for providing domain-specific large language models to facilitate automated analytics of unstructured streams of natural language data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DSMMA device 202 via broadband or cellular communication. Of course, these embodiments are merely exemplary and are not limiting or exhaustive.

Upon being started, the domain-specific model management and analytics module 302 executes a process for providing domain-specific large language models to facilitate automated analytics of unstructured streams of natural language data. An exemplary process for providing domain-specific large language models to facilitate automated analytics of unstructured streams of natural language data is generally indicated at flowchart 400 in FIG. 4.

Figure 4:
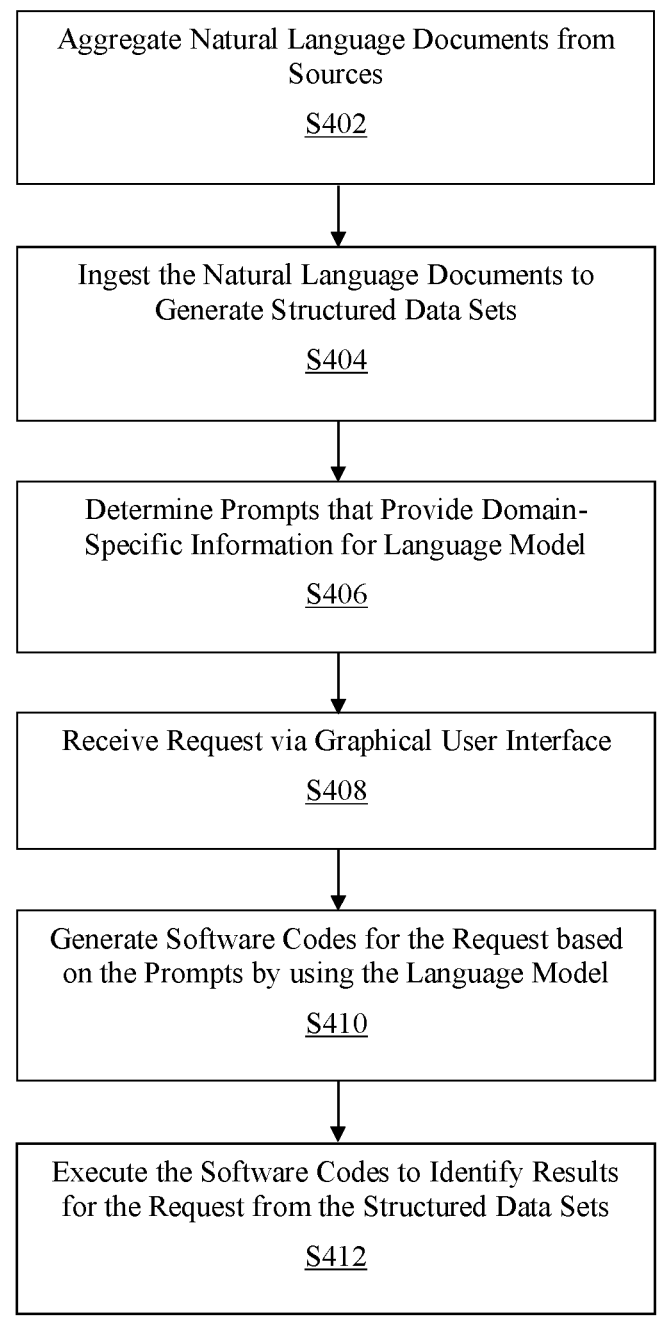
FIG. 4 is a flowchart of an exemplary process for implementing a method for providing domain-specific large language models to facilitate automated analytics of unstructured streams of natural language data.

In the process 400 of FIG. 4, at step S402, a plurality of documents may be aggregated from various sources. Each of the plurality of documents may include natural language data. In an exemplary embodiment, the plurality of documents may be automatically aggregated from the sources based on a predetermined aggregating criterion such as, for example, a time frame and a document type. The plurality of documents may be automatically aggregated by using efficient search and download tools such as, for example, a filing parser to organize documents such as, for example, omnibus fillings and custodial contracts into machine readable content.

In another exemplary embodiment, the custodial contracts may correspond to an agreement that details an arrangement wherein a custodian holds an asset or property on behalf of an actual owner. These agreements may be housed in various forms as exhibits of main documents. The documents may include master agreements as well as amended agreements. The procurement system may collate these documents from specified time periods such as, for example, the past ten years to generate a corpus of documents. Consistent with present disclosures, the specified time periods may be adjusted based on user preference via interactions with a graphical user interface.

At step S404, each of the plurality of documents may be ingested to generate structured data sets. The structured data sets may be organized according to a contextual hierarchy. In an exemplary embodiment, the documents may be automatically ingested to generate the structured data sets. To facilitate the ingesting of the documents, tags may be attached to each of the documents based on content of the corresponding natural language data. Each of the tags may include corresponding metadata that provides information about the documents. The corresponding metadata may include supplemental information that is automatically identified and automatically retrieved for each of the documents. The supplemental information may include at least one from among filing information, participant information, agreement information, and date information.

Then, data tables in each of the documents may be formatted to facilitate the discovery of corresponding table boundaries. The data tables may be formatted by associating each of the data tables with a corresponding placeholder reference. The placeholder reference may represent a spatial relationship between the data tables and the corresponding documents. The placeholder reference may be persisted within the corresponding documents in place of the corresponding data tables. For example, the placeholder reference to the data tables may be left in the original documents to retain spatial relationships for the language model. Additionally, the table boundaries may be discovered by using spatial positioning of table contents, table styles, visual table indicators, and textual table indicators. Rows and columns of the data tables may also be organized into a machine-readable format.

Finally, each of the documents may be segmented into sections by using stylistic indicators and contextual indicators. Each of the sections may include direct citations to original data in the corresponding documents. Further, each of the sections may include section labels that are assigned according to a tree hierarchy to preserve full sectional context.

In another exemplary embodiment, the tags may be attached by using an efficient and scalable labeling system that automatically sources relevant metadata without requiring additional user input. By attaching searchable tags based on the content of the documents, the corpus of documents may be searchable by using a search criterion such as, for example, a filing trust, a custodian provider, an agreement date, and an effective filing date. The searchable tags may enable the disclosed invention to search and retrieve relevant documents based on relationships and temporal dimensions.

In another exemplary embodiment, the custodian providers may be efficiently tagged by matching a listing of known custodian banks, which are written in various styles, to the corresponding parties of the contract. The matching may be implemented with approximate string matching such that a candidate string representing the provider is measured against a query string representing the contract to discover which of the known providers are best matched. The matching may be determined according to corresponding string distance metrics.

Insertions, deletions, and substitutions of characters may also be measured by using the matching algorithms. In addition, the matching algorithm may reject all candidates when all the candidates diverge too drastically from the query context, which may indicate that the contract does not explicitly name a provider. Similarly, the dates may be efficiently process by using regular expressions to match common date patterns with context keywords such as, for example, a "dated" keyword and an "effective as of" keyword that are used as quick labels for the date. The aforementioned techniques for sourcing data may be usable to train more sophisticated entity extraction models with machine-annotated examples.

In another exemplary embodiment, the data tables in the documents may be specially formatted and extracted with structure intact by discovering associated tags such as, for example, Hypertext Markup Language (HTML) tags. A unique placeholder reference to the data tables may be left in the original document to allow for quick rendering and processing of content while retaining spatial relationships in language models. By discovering table boundaries within documents, table contents may be expressed to the language models in several ways. First, the data tables may be provided to the language models as is. Second, table headers may be provided, and the language models may be allowed to write code to query the data tables. Third, each column cell may be expressed as {COLUMN} {ROW} {VALUE} or {ROW} {COLUMN} {VALUE} triplets. For example, the triplet may indicate that FEE RATE for LUXEMBOURG is 34 BASIS POINTS, where FEE RATE is the column, LUXEMBOURG is the row, and 34 BASIS POINTS are the Row/Column value.

In another exemplary embodiment, the sectioning of tables may enable the retrieval of full tables as context for the language models with original data organization intact. To discover table boundaries, a sophisticated layout and styling aware algorithm may be used. The algorithm may exploit spatial positioning of content, styles, and other visual and/or textual cues to discover the table boundaries. Further, the processing of the data tables may organize rows and columns into a machine-readable format so that the aforementioned representation of the data tables to the language models may be generated for the user query according to the disclosed system's generated workflow.

In another exemplary embodiment, documents and contracts may be automatically segmented into sections by using a combination of stylistic and contextual clues. Hierarchy of the sections may be important in providing relevant context for the language models. As such, a tree-based section algorithm that organizes sections into a tree hierarchy may be implemented. An advantage of this system may be that all corresponding sub sections are automatically included in the context when retrieving a termination clause. Additionally, embedding based semantic search may be able to pull a relevant section as well as all sub-sections that are not explicitly captured.

Thus, the hierarchy based approach to semantic retrieval may provide various benefits. The first benefit may be that all sections are segmented in an intelligent way to preserve full context. The second benefit may be that sections are labeled according to a document hierarchy such that when a high-level clause is retrieved, all sub-sections related to that clause may also be retrieved. For example, when fetching termination clauses, it may be important to retrieve corresponding exit procedures and corresponding cancellations, which are labeled as sub-sections of the termination clauses.

The third benefit may be that the segmentation system also provides direct citations to the original data. The direct citations may allow users to inspect any given text and modify any portion of the variables such as, for example, dropping agreements and highlighting key focal points for context to provide better feedback, which may then be re-run on the same generated workflow. The human feedback may be collected to improve the underlying models and algorithms involved in the disclosed system. The feedback data may enable the finetuning of the language model based on the full text of agreements retrieved. The improvement may extend to language and contextual understanding of the domain by the language model.

At step S406, prompts that provide domain-specific information for a language model may be determined. In an exemplary embodiment, the domain-specific information may include instructions such as, for example, application programming interface instructions to access the structured data sets. Consistent with present disclosures, the domain-specific information may empower the language model by turning the language model into a domain-specific language model. That is, the language model may perform domain-specific tasks by first giving the generated prompts to the language model.

In another exemplary embodiment, the prompts may be automatically generated to provide information for the language model. Each of the prompts may include at least one from among scenario data that defines a domain-specific scenario, interface data that defines usable application programming interfaces, and instruction data that orders the language model to generate the software codes by using the interface data.

In another exemplary embodiment, the language model may include at least one from among a large language model, a deep learning model, a neural network model, a natural language processing model, a machine learning model, a mathematical model, a process model, and a data model. The language model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S408, requests may be received from a user via a graphical user interface. The requests may relate to questions and/or commands from the user in a natural language format. In an exemplary embodiment, the requests may relate to an utterance and/or a sentence that is worded or expressed to elicit information. The requests may also relate to instructions for performing a desired function. The requests may include at least one from among a clause search request, a question answering request, a summarizing request, a retrieval request, a compare request, a drafting request, a related parties request, a fee calculation request, a data management request, a risk assessment request, an analysis request, a review request, and a monitoring request.

The clause search request may relate to a search for any clause from the contractual agreements in the structured data sets. The question answering request may relate to extractive answers, which are directly linked to the source document, or abstractive answers, which are generated via the language model, that are based on retrieved content. The summarize request may relate to an automatic summarization of key contractual points in a natural language format for the user. The retrieval request may relate to an extraction of any relevant contracts from the structured data sets for download by the user. The compare request may relate to a step-by-step differential analysis of two sections in different documents.

The drafting request may relate to the drafting of a new clause with new key language based on a sample clause that is provided by the user. The related parties request may relate to a determination of all related parties to a set of agreements through entity extraction and disambiguation. The fee calculation request may relate to the providing of high-level estimates of average fees and/or aggregated fees for certain regions according to a given fee table from an agreement. The data management request may relate to the providing of structured data to help users identify the information that they need and/or identify relevant dates at scale.

The risk assessment request may relate to the assessment of risks associated with a clause and/or a section. The analysis request may relate to the identifying of key clauses and terms, which are stored as metadata for future searches, for large-scale contract reviews. The review request may relate to the identifying of inconsistencies and/or errors in legal contracts during drafting or in review of filed contracts. The monitoring request may relate to the analyzing of contractual agreements to provide key terms that parties must comply with. Clearly providing the key terms may help to avoid legal disputes, mitigate risks, and ensure compliance.

At step S410, software codes for the requests may be generated based on the determined prompts. In an exemplary embodiment, the software codes may be automatically generated by using the language model. The software codes may include executable program codes in any programming language that utilizes the provided information in the prompts such as, for example, the provided application programming interface information to generate results that answer and/or fulfill the requests from the user. Consistent with present disclosures, the language models may automatically generate modularized functions that can take variants of user questions.

At step S412, each of the software codes may be executed to identify results for the requests from the structured data sets. The software codes may be automatically executed as well as manually executed by the user. In an exemplary embodiment, the software codes may be automatically executed without additional user intervention. The software codes may be automatically executed based on a predetermined guideline such as, for example, an operational guideline and/or a user preference. For example, the user may interact with the graphical user interface to provide user preferences for automated software execution.

In another exemplary embodiment, the software codes may be manually executed by the user based on an interaction with the graphical user interface. The graphical user interface may include graphical elements that are configured to accept inputs from the user. The user may interact with the graphical elements to indicate a desire to execute particular software codes. For example, the user may interact with a specific software code from a listing of software codes on the graphical user interface to indicate a desire to execute the specific software code.

In another exemplary embodiment, the executed software codes may utilize the application programming interfaces that are associated with the structured data sets to generate the results for the requests. The automatically generated software codes may leverage the application programming interfaces that are provided in the corresponding prompts to answer the questions from the user. By executing the software codes, results may be identified from the structured data sets in response to user inquiries. Consistent with present disclosures, the results may include a modularization of a previously generated software code into functions that answer variants of the user questions.

In another exemplary embodiment, sources that correspond to the generated results may be mapped to the results as a footnote. The sources may include the corresponding documents where the results were found as well as the specific sections in the corresponding documents where information for the results were identified. For example, the footnote may include a name of the document and a section title for each of the results.

In another exemplary embodiment, the footnote may include a digital reference such as, for example, a hyperlink that the user may follow, or be guided to, based on an interaction with the digital reference. The digital reference may take the user to the document and/or a specific element within the document that corresponds to the results. For example, the user may click on the digital reference to access a specific passage in the document where information for the result was identified. Alternatively, the user my click on the digital reference to access a summary page where the specific passages that correspond to the results have been extracted for presentation and quick reference.

Figure 5:
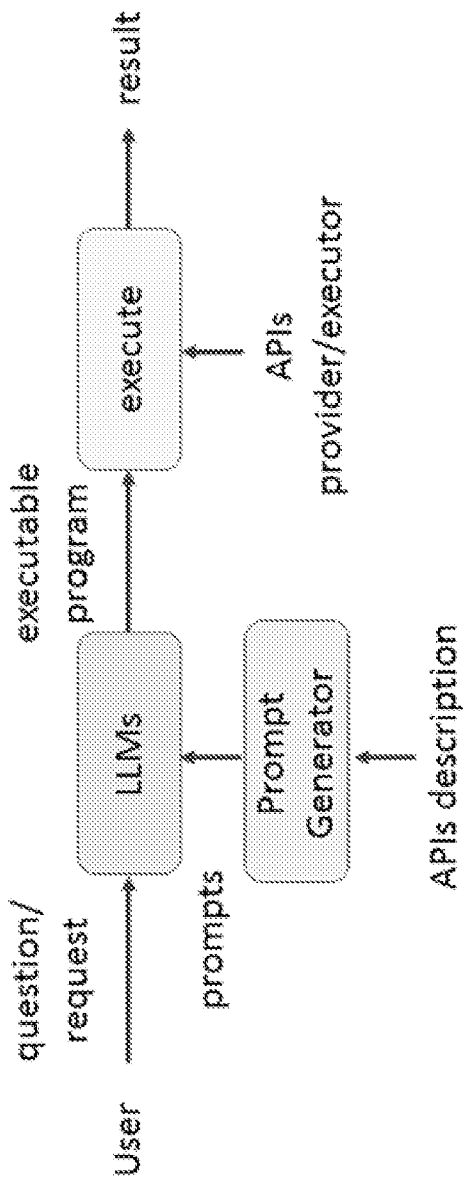
FIG. 5 is a flow diagram of an exemplary process for implementing a method for providing domain-specific large language models to facilitate automated analytics of unstructured streams of natural language data.

FIG. 5 is a flow diagram 500 of an exemplary process for implementing a method for providing domain-specific large language models to facilitate automated analytics of unstructured streams of natural language data. In FIG. 5, the language model may be converted into a domain-specific language model to provide responses to user requests that are received in a natural language format.

As illustrated in FIG. 5, the language model may be configured to perform domain-specific tasks by first giving prompts to the language model. The prompts may be automatically generated by a prompt generator to provide information for the language model. Each of the prompts may include at least one from among scenario data that defines a domain-specific scenario, interface data that defines usable application programming interfaces, and instruction data that orders the language model to generate the software codes by using the interface data.

Then, the language model may be able to take user questions and/or requests and automatically generate executable programs in any programming language. The executable programs may leverage the provided information such as, for example, the provided application programming interface information for structured data sets to generate a response to the user questions and/or requests. The programs may be automatically executed within the framework of the disclosed invention to generate the results, which answers and/or fulfills the user questions and/or requests. Consistent with present disclosures, the language models may also automatically generate modularized functions that can take variants of user questions.

Figure 6:
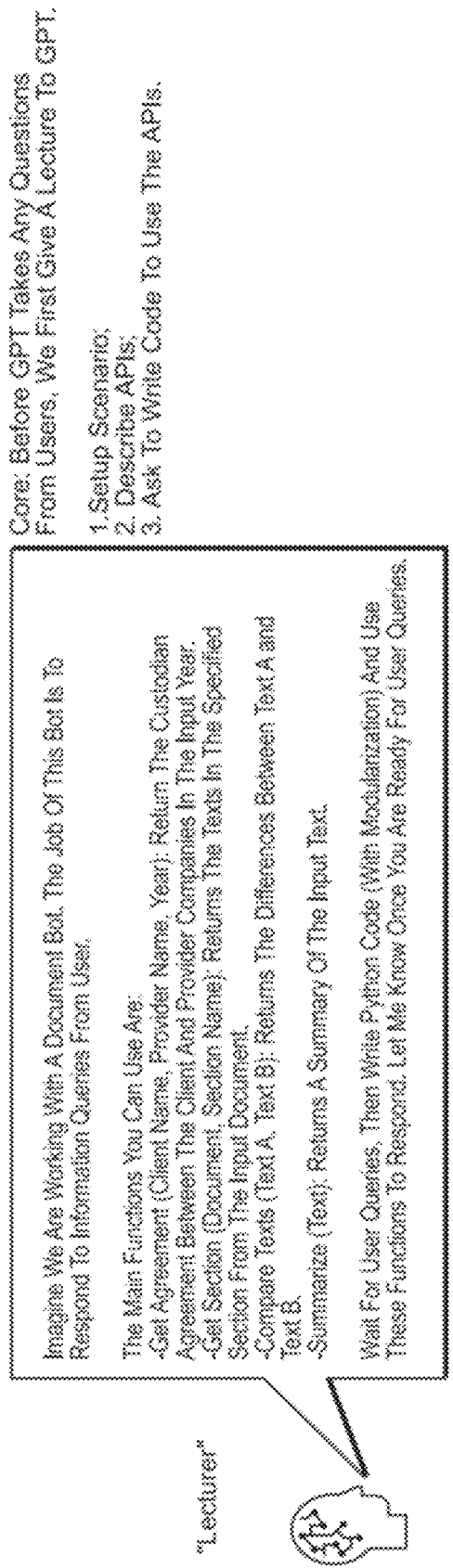
FIG. 6 is a screen shot that illustrates a graphical user interface that is usable for implementing a method for providing domain-specific large language models to facilitate automated analytics of unstructured streams of natural language data, according to an exemplary embodiment.
Figure 6:
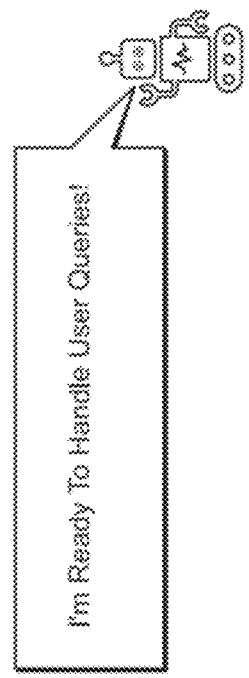

FIG. 6 is a screen shot 600 that illustrates a graphical user interface that is usable for implementing a method for providing domain-specific large language models to facilitate automated analytics of unstructured streams of natural language data, according to an exemplary embodiment. In FIG. 6, the lecture prompts may be generated by the prompt generator to provide domain-specific instructions to the language model. Each of the prompts may include at least one from among scenario data that defines a domain-specific scenario, interface data that defines usable application programming interfaces, and instruction data that orders the language model to generate the software codes by using the interface data.

As illustrated in FIG. 6, the generated prompts may be provided to the language model for processing by the language model. Once confirmation is received that the language model is ready to take user questions and/or requests, the user may start interacting with the language model, which automatically generates software codes that leverage the information in the prompts.

Accordingly, with this technology, an optimized process for providing domain-specific large language models to facilitate automated analytics of unstructured streams of natural language data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a domain-specific language model to facilitate natural language data analytics, the method being implemented by at least one processor, the method comprising:

aggregating, by the at least one processor, a plurality of documents from at least one source, each of the plurality of documents including natural language data;

ingesting, by the at least one processor, each of the plurality of documents to generate at least one structured data set that is organized according to a contextual hierarchy, wherein the ingesting of each of the plurality of documents further comprises:

attaching, by the at least one processor, at least one tag to each of the plurality of documents based on content of corresponding natural language data, each of the at least one tag including corresponding metadata;

formatting, by the at least one processor, at least one data table in each of the plurality of documents to discover at least one corresponding table boundary wherein the formatting of the at least one data table further comprises:

associating, by the at least one processor, each of the at least one data table with a corresponding placeholder reference, the placeholder reference representing a spatial relationship between the at least one data table and the plurality of documents; and persisting, by the at least one processor, the placeholder reference within the corresponding plurality of documents in place of the corresponding at least one data table; and segmenting, by the at least one processor, each of the plurality of documents into at least one section by using at least one stylistic indicator and at least one contextual indicator;

determining, by the at least one processor, at least one prompt that provides domain-specific information for a language model, the domain-specific information including instructions to access the at least one structured data set;

receiving, by the at least one processor, a request via a graphical user interface, the request relating to at least one question in a natural language format;

generating, by the at least one processor using the language model, at least one software code for the request based on the at least one prompt; and executing, by the at least one processor, each of the at least one software code to identify at least one result for the request from the at least one structured data set.

2. The method of claim 1, wherein each of the at least one prompt includes at least one from among scenario data that defines a domain-specific scenario, interface data that defines at least one usable application programming interface, and instruction data that orders the language model to generate the at least one software code by using the interface data.

3. The method of claim 1, wherein the at least one result includes a modularization of a previously generated software code into at least one function that answers a variant of the at least one question.

4. The method of claim 1, wherein the corresponding metadata includes supplemental information that is automatically identified and automatically retrieved for each of the plurality of documents, the supplemental information including at least one from among filing information, participant information, agreement information, and date information.

5. The method of claim 1, wherein each of the at least one section includes at least one direct citation to original data in the corresponding plurality of documents; and wherein each of the at least one section further includes at least one section label that is assigned according to a tree hierarchy to preserve full sectional context.

6. The method of claim 1, further comprising:
discovering, by the at least one processor, the at least one table boundary by using spatial positioning of table contents, table styles, visual table indicators, and textual table indicators; and
organizing, by the at least one processor, at least one row and at least one column into a machine-readable format.

7. The method of claim 1, wherein the language model includes at least one from among a large language model, a deep learning model, a neural network model, a natural language processing model, a machine learning model, a mathematical model, a process model, and a data model.

8. A computing device configured to implement an execution of a method for providing a domain-specific language model to facilitate natural language data analytics, the computing device comprising:
a processor;
a memory; and
a communication interface coupled to each of the processor and the memory,
wherein the processor is configured to:
aggregate a plurality of documents from at least one source, each of the plurality of documents including natural language data;
ingest each of the plurality of documents to generate at least one structured data set that is organized according to a contextual hierarchy, wherein the ingest of each of the plurality of documents, the processor is further configured to:
attach at least one tag to each of the plurality of documents based on content of corresponding natural language data, each of the at least one tag including corresponding metadata;
format at least one data table in each of the plurality of documents to discover at least one corresponding table boundary wherein, to format the at least one data table, the processor is further configured to:
associate each of the at least one data table with a corresponding placeholder reference, the placeholder reference representing a spatial relationship between the at least one data table and the plurality of documents; and
persist the placeholder reference within the corresponding plurality of documents in place of the corresponding at least one data table; and
segment each of the plurality of documents into at least one section by using at least one stylistic indicator and at least one contextual indicator;
determine at least one prompt that provides domain-specific information for a language model, the domain-specific information including instructions to access the at least one structured data set;
receive a request via a graphical user interface, the request relating to at least one question in a natural language format;
generate, by using the language model, at least one software code for the request based on the at least one prompt; and
execute each of the at least one software code to identify at least one result for the request from the at least one structured data set.

9. The computing device of claim 8, wherein each of the at least one prompt includes at least one from among scenario data that defines a domain-specific scenario, interface data that defines at least one usable application programming interface, and instruction data that orders the language model to generate the at least one software code by using the interface data.

10. The computing device of claim 8, wherein the at least one result includes a modularization of a previously generated software code into at least one function that answers a variant of the at least one question.

11. The computing device of claim 8, wherein the corresponding metadata includes supplemental information that is automatically identified and automatically retrieved for each of the plurality of documents, the supplemental information including at least one from among filing information, participant information, agreement information, and date information.

12. The computing device of claim 10, wherein each of the at least one section includes at least one direct citation to original data in the corresponding plurality of documents; and wherein each of the at least one section further includes at least one section label that is assigned according to a tree hierarchy to preserve full sectional context.

13. The computing device of claim 8, wherein the processor is further configured to:
discover the at least one table boundary by using spatial positioning of table contents, table styles, visual table indicators, and textual table indicators; and
organize at least one row and at least one column into a machine-readable format.

14. The computing device of claim 8, wherein the language model includes at least one from among a large language model, a deep learning model, a neural network model, a natural language processing model, a machine learning model, a mathematical model, a process model, and a data model.

15. A non-transitory computer readable storage medium storing instructions for providing a domain-specific language model to facilitate natural language data analytics, the storage medium comprising executable code which, when executed by a processor, causes the processor to:
aggregate a plurality of documents from at least one source, each of the plurality of documents including natural language data;
ingest each of the plurality of documents to generate at least one structured data set that is organized according to a contextual hierarchy, wherein the ingest of each of the plurality of documents, the processor is further configured to:

attach at least one tag to each of the plurality of documents based on content of corresponding natural language data, each of the at least one tag including corresponding metadata;

format at least one data table in each of the plurality of documents to discover at least one corresponding table boundary wherein, to format the at least one data table, the processor is further configured to:

associate each of the at least one data table with a corresponding placeholder reference, the placeholder reference representing a spatial relationship between the at least one data table and the plurality of documents; and persist the placeholder reference within the corresponding plurality of documents in place of the corresponding at least one data table; and segment each of the plurality of documents into at least one section by using at least one stylistic indicator and at least one contextual indicator;

determine at least one prompt that provides domain-specific information for a language model, the domain-specific information including instructions to access the at least one structured data set;

receive a request via a graphical user interface, the request relating to at least one question in a natural language format;

generate, by using the language model, at least one software code for the request based on the at least one prompt; and execute each of the at least one software code to identify at least one result for the request from the at least one structured data set.

16. The storage medium of claim 15, wherein each of the at least one prompt includes at least one from among scenario data that defines a domain-specific scenario, interface data that defines at least one usable application programming interface, and instruction data that orders the language model to generate the at least one software code by using the interface data.

\* \* \* \* \*